US007987241B2

(12) United States Patent
St Jacques, Jr. et al.

(10) Patent No.: US 7,987,241 B2
(45) Date of Patent: Jul. 26, 2011

(54) SHARING EIP SERVICE APPLICATIONS ACROSS A FLEET OF MULTI-FUNCTION DOCUMENT REPRODUCTION DEVICES IN A PEER-AWARE NETWORK

(75) Inventors: Robert J. St Jacques, Jr., Fairport, NY (US); Hua Liu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 344 days.

(21) Appl. No.: 12/251,482

(22) Filed: Oct. 15, 2008

(65) Prior Publication Data

US 2010/0094925 A1   Apr. 15, 2010

(51) Int. Cl.
G06F 15/16 (2006.01)
G06F 3/00 (2006.01)
(52) U.S. Cl. .................. 709/217; 709/229; 715/738
(58) Field of Classification Search .................. 715/738; 707/999.01; 709/202, 217–219, 221, 225, 709/229
See application file for complete search history.

(56) References Cited

U.S. PATENT DOCUMENTS

| 6,026,436 | A | 2/2000 | Hawes |
| 2004/0205153 | A1* | 10/2004 | Weisshaar et al. ............ 709/217 |
| 2006/0050294 | A1 | 3/2006 | Smith et al. |
| 2006/0253584 | A1* | 11/2006 | Dixon et al. .................. 709/225 |
| 2007/0198487 | A1 | 8/2007 | Masuda et al. |
| 2007/0244894 | A1 | 10/2007 | St. Jacques |
| 2008/0046546 | A1 | 2/2008 | Parmar et al. |
| 2008/0222154 | A1 | 9/2008 | Harrington et al. |
| 2009/0055749 | A1* | 2/2009 | Chatterjee et al. ............ 715/738 |

OTHER PUBLICATIONS

"From Peripheral to Platform: MFP Software Development Tools and Xerox's Extensible Interface Platform," Oct. 2006, pp. 1-17, A White Paper prepared by Bissett Communications Corporation (on behalf of Xerox Corporation), the publisher of *The MFP Report* newsletter.

"Expanding the MFP Ecosystem with Xerox's Extensible Interface Platform (EIP)," Jun. 2008, pp. 1-28, A White Paper prepared by Bissett Communications Corporation (on behalf of Xerox Corporation), the publisher of *The MFP Report* newsletter.

* cited by examiner

*Primary Examiner* — Peling A Shaw
(74) *Attorney, Agent, or Firm* — Philip E. Blair; Fleit Gibbons Gutman Bongini & Bianco P.L.

(57) ABSTRACT

What is disclosed is a system and method for automatically registering and de-registering custom EIP service application solutions across a fleet of multi-function document reproduction devices in peer-aware network. As described herein, through an implementation of the present method, custom EIP service solutions installed on one computer platform can be automatically replicated and shared across a fleet of multi-function devices without requiring manual registration of the newly deployed service with each device. Registration makes the service user-selectable directly from the device's UI. Further, when a service goes off-line or otherwise becomes available, the service is automatically de-registered with devices whereon the service has been registered. A single instance of an application service can be rapidly replicated without manual intervention. The present system is scalable from a few nodes to many nodes as additional resources are brought online.

12 Claims, 6 Drawing Sheets

SHARING EIP SERVICE APPLICATIONS ACROSS A FLEET OF MULTI-FUNCTION DOCUMENT REPRODUCTION DEVICES IN A PEER-AWARE NETWORK

TECHNICAL FIELD

The present invention is directed to systems and methods for automatically sharing application service solutions across a fleet of multi-function document reproduction devices in a peer-aware network.

BACKGROUND

A peer-to-peer (P2P) network uses diverse connectivity between participants in a network and the cumulative bandwidth of the network participants rather than conventional centralized resources where a relatively low number of servers provide the core value to an application service. P2P networks are typically used for connecting nodes via largely ad-hoc connections. Such networks are useful for many purposes such as sharing file content containing audio, video, or any files in digital format. A pure P2P network does not have the notion of separate clients and servers but rather the nodes are viewed as equal peers that simultaneously function as both clients and servers on the network. This differs from other network arrangements where communication is to/from a central server serving clients across the network. One example is an FTP server where the client and server programs are distinct, the clients initiate the download/uploads, and the servers react to and satisfy these requests. A node can be considered a connection point, either a redistribution point or an end point. In general, each node has the capability to recognize, process, and forward transmissions to other nodes across the network.

Many multi-function devices found in document reproduction (print/copy job) environments support the Extensible Interface Platform (EIP). The EIP platform helps effectuate the development, installation, and operation of custom service solutions designed to help businesses leverage existing application solutions such as Eros, Corms and Elms, along with existing database solutions such as SAP, Oracle, SharePoint, etc. An EIP service is a web-based application developed via the EIP Software Development Kit freely available from the Xerox Corporation, Norwalk, Conn. USA. EIP software generally includes three broad categories of application programming interfaces (APIs). Multifunction Services APIs provide tools for programming and controlling various device capabilities and functionality. Also included in this group are interfaces enabling, for example, job accounting and authentication. Management Services APIs help control various aspects of multi-function device management. Presentation Services APIs help manage the presentation of web pages, service icons, and the display of other information on a user interface of the device.

Vendors develop custom EIP service applications to address organization-specific business challenges. One example service integrates employee badge information into a security solution which allows employees to swipe their badges at a card-reader integrated with the multi-function device to gain access to device features that can be individually tracked, for example, for accounting and regulatory purposes. Another service solution enables a system operator to access secure print queues and release jobs at one of a plurality of document reproduction devices across their enterprise network. Yet another allows a user to scan directly to a client folder.

When an instance of an EIP service gets installed on a computer platform on the network of multi-function devices, an administrator must manually register the newly installed service with each device whereon that service is intended to be made accessible. Typically, registration of a newly deployed EIP service application involves an administrator connecting to each device and manually entering various information about the service such as, for example, the location of the service application on the network; the location of an icon image for the service; any text to be displayed along with the icon; and pointing the device to any other files required by the service. Once all the information has been entered, the device's browser functionality retrieves the files from the platform hosting the newly deployed service. Completion of the registration means that an icon for that service appears on the device UI and the service is now accessible by a user of the device.

Manual registration and configuration of newly deployed application services across a fleet of multi-function devices can be a time consuming and tedious task. Manually entering information can be error prone. Registered services need to be tested from each device's UI to ensure that all the information required to invoke that service was entered correctly. Otherwise, the service may not operate as intended. Further, when a service becomes no longer available on the network such as, for instance, the platform hosting the installed service is off-line due to a network failure on the subnet serving the service, that service must be manually de-registered from all devices in a similar manner. A user selection of a service icon from a device UI invoking an application that is unavailable may have unintended consequences. Manual registration and de-registration of services across large numbers of multi-function devices may cause frustration among administrators of fleets of document reproduction devices. Solutions enabling automatic registration and de-registration of custom application services have been solicited.

Accordingly, what is needed in this art is a method for automatic registration and de-registration of EIP service applications across a fleet of multi-function devices in a peer-aware network environment.

BRIEF SUMMARY

What is provided is a novel system and method for automatically registering and de-registering custom EIP service application solutions across a fleet of multi-function document reproduction devices in an enterprise peer-aware network. In such a manner, an instance of a custom EIP service solution can be rapidly replicated and automatically shared among a plurality of document reproduction devices. EIP services can be automatically de-registered from devices when the hosted application becomes no longer available. In addition, duplicate EIP services known to exist on the network can automatically be prioritized and selected based on, for instance, load balancing techniques such as round-robin, usage history, and the like, or by performance and optimization algorithms which account for factors such as network traffic, available bandwidth, system loads, etc.

In one example embodiment, computer platforms are placed in digital communication with other platforms in the network. Each computer platform is a registrar for automatic runtime registration and de-registration of custom EIP service applications with multi-function document reproduction devices being served on their respective subnets. When a new EIP service is installed on one of the computer platforms in the network (the host platform), the computing platform hosting the service broadcasts an advertisement about the newly added EIP service across the network. Various embodiments of the broadcasted advertisement are provided. Upon receipt, each computer platform checks their respective lookup tables to determine if a table entry for this EIP service exists. A table entry maps an EIP service to a unique location on the host platform. If no table entry exists for this EIP service then this is a new service. The newly installed EIP service is added to each respective lookup table. If a table entry exists for this EIP service from this same host platform then the table entry is updated to mark the time when this service was last known to be available. If a table entry for this EIP service exists but is now being advertised by a different host platform then the service is added to a list of identical EIP services in the table entry for this service. If this is a first instance of this EIP service then a proxy is created and associated with the table entry for this particular service. Information about the newly added EIP service is provided to the multi-function device. A registration service application hosted by the multi-function device causes an icon for this EIP service to appear on the UI. The icon is associated with the service proxy. Registration is complete when the icon appears on the device UI. The newly installed EIP service is now selectable by a user. Selection of the icon invokes the associated service proxy. The proxy references the table entry for this EIP service and retrieves fields in the table entry to initiate a communication with the platform hosting the service. The service proxy proceeds to direct and re-direct communication between the hosted service and the requesting device. In the case where more than one identical service exists in the table entry, the proxy automatically selects one of the listed services and proceeds to access that service. If an installed EIP service becomes no longer available through one or more determinative methods provided herein, the EIP service is automatically de-registered from the devices whereon the service is registered. De-registering involves, in part, deleting the table entry for this EIP service from the lookup table, terminating the service proxy, and removing the icon from the UI. Various other embodiments, features, and enhancements have also been provided.

Advantageously, small footprint computer platforms capable of hosting service applications over a P2P network can be purchased at relatively low cost and configured to perform the present method. Such platforms can be placed in close proximity to the multi-function devices on their respective subnets to reduce latency. One or more platforms can be configured to only host service applications and not serve as a registrar for any multi-function devices. Such a platform would preferably be placed in an area readily accessible to IT Managers, System Administrators, and the like, for quick installation of new service solutions as these are developed, tested, and deployed. Other advantages will become apparent.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
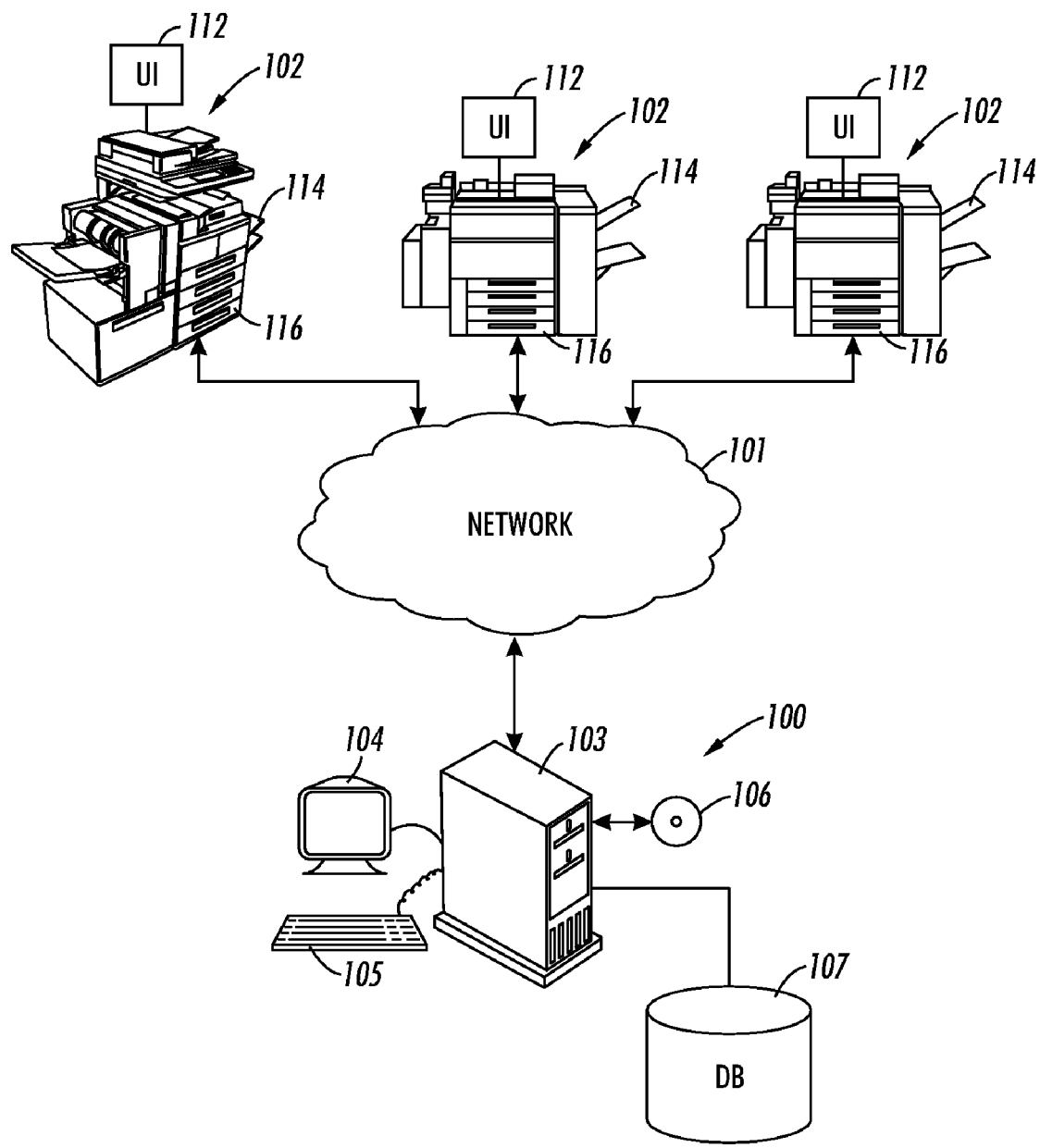
FIG. 1 illustrates one example computer platform in digital communication with a plurality of multi-function devices.

What is provided is a system and method for sharing custom EIP service application solutions across a fleet of multi-function document reproduction devices in an enterprise network.

It should be understood that one of ordinary skill in this art would be readily familiar with many facets of distributed computing, networks and network configurations, digital communication techniques, host platforms and servers and proxies, and the like. One of ordinary skill would also be knowledgeable about hardware/software systems and methods and programming techniques sufficient to implement the functionality and capabilities described herein in their own enterprise networks without undue experimentation.

A server refers to a software or hardware construct capable of hosting service applications and for providing those resources to requesting devices over a network. There are different types of servers such as, for example, application servers, database servers, file servers, proxy servers, to name a few. One server is commonly used per computer to limit the damage which may be caused by a hardware failure or by a security breach. Multiple servers may run concurrently on a single computer under light loading, but multiple computers may be required to run a single server under heavy loading. Server software and hardware systems are readily available.

A proxy is a software application program capable of forwarding client requests for a resource to a server hosting a requested resource and redirecting responses back to the requesting client. A proxy may alter the client's request or the servers response and may even provide the requested resource directly to the client without contacting the host. In the latter case, the proxy caches a previous request such that subsequent requests for that same resource can be quickly provided. A proxy that redirects all requests and replies unmodified to/from a client is often referred to as a gateway or tunneling proxy. A proxy can reside on the client or may reside along key points between the client and server. Service proxies typically involve a traditional client-server relationship with direct point-to-point communication. A proxy can be programmed to perform a variety of functions, including data storage and retrieval.

A Uniform Resource Locator (URL) is a string of characters which defines a resource by it's location on a network. A first part of the URL is a protocol identifier and a second part specifies a location. A Uniform Resource Identifier (URI) is a string of characters which identifies a resource by a specific syntax and protocols to enable an interaction with that resource. A URL is a URI that, in addition to identifying a location, provides a means of acting upon or obtaining a representation of that resource by describing its primary access mechanism.

In computer networks based on the Internet Protocol Suite, a sub-network, or subnet, is a portion of the network's computers and network devices that have a common, designated IP address routing prefix. A routing prefix is the sequence of leading bits of an IP address that precede the portion of the address used as host identifier. Subnet is a well-known networking term that implies a logical division between devices on a network to limit nodes, decrease competition for bandwidth, and improve performance.

A networked computer platform (NCP) refers to a computer system known in the arts capable of communicating with other computer systems and multi-function devices over a network. Such systems include a desktop computer, laptop computer, mainframe, a motherboard, a special purpose computer, or other dedicated hardware. Such platforms have at least a processor, memory, storage, network interface, and other software and hardware resources. A networked computer platform is capable running a server for serving that hosted service over a network. Such a computer platform is also capable of executing machine readable program instructions which, when loaded onto the computer platform and executed, cause the platform to perform one or more aspects of the methods provided herein.

A multi-function device (MFD) generally refers to devices known in the digital document reproduction arts which includes printers, copiers, newspaper production print system, book publishing systems, photographic printing and image reproduction equipment, image capturing devices, facsimile, scanners, to name a few. Such multi-function devices generally provide a user interface (UI) such as touchscreen and a display device such for example as a CRT or LCD. Many MFDs further provide a means for user interaction such as a keyboard, keypad, touchpad, mouse, etc. Although a multi-function device is used herein to generally refer to document reproduction devices, it should be understood that the term multi-function device is intended to encompass a wide variety of devices which can be placed in digital communication over a network with one or more computer platforms and/or with other multi-function devices. It should also be understood that one or more functions, features, or capabilities of a computer platform may reside within a multi-function device. Any portion of a computer platform may be integrated, in whole or in part, with a multi-function device.

An EIP service application (or "EIP application service") is a machine executable software program for management, control, and/or operation of one or more functions of a multi-function device or for facilitating a particular workflow. Such software programs can also facilitate and/or manage remote access to and communication with local area networks and global networks. Application services may also access files and directories over an internet or intranet. Service applications are also capable of accessing, managing, manipulating, storing, and retrieving data from storage media or a database. Service applications are typically customized software solutions designed to address particular business challenges by taking better advantage of features and capabilities of various document reproduction devices in their enterprise network environments. As stated in the background hereof, many multi-function document reproduction devices found in print/copy job environments support the Extensible Interface Platform (EIP). The EIP platform helps effectuate the development, installation, and operation of custom service solutions designed to help businesses leverage existing application solutions. An EIP service solution is a web-based application developed via the EIP Software Development Kit freely available from the Xerox Corporation, Norwalk, Conn. USA. EIP software generally includes three broad categories of application programming interfaces (APIs). Multifunction Services APIs provide tools for programming and controlling various device capabilities and functionality. Also included in this group are interfaces enabling, for example, job accounting and authentication. Management Services APIs help control various aspects of multi-function device management. Presentation Services APIs help manage the presentation of web pages, service icons, and the display of other information on a user interface of the device. Vendors develop custom EIP service applications to address organization-specific business challenges. One example EIP application service solution is shown and discussed with respect to FIG. 5A.

Reference is now made to FIG. 1 which illustrates one example computer platform in digital communication with a plurality of multi-function devices.

Computer platform 100 is in digital communication with a plurality of multi-function document reproduction devices 102 over a network connection shown as amorphous cloud 101. The computer platform and the plurality of multi-function document reproduction devices collectively form a subnet. Techniques for placing computers in network communication with digital devices are well established. Therefore, a discussion as techniques for placing such systems and document reproduction devices in network communication has been omitted. The computer platform is shown comprising a computer 103 housing therein a motherboard, CPU, memory, interface, storage device, and a communications link such as a network card. The computer may also include a display 104 such as a CRT or LCD. An alphanumeric keyboard 105 and a mouse (not shown) provide a mechanism for user input. Also shown is computer program product 106 containing machine executable instructions such as, for example, a service application, and other program instructions for implementing the functionality and features discussed herein. Such a computer platform may further include database 107, as is known in the arts for storage and retrieval of data. The computer platform is capable of running a server software program (or housing server hardware) for hosting installed service applications. Server software capable of hosting service applications are readily available from a variety of vendors. The computer platform is further capable of creating and running service proxies for directing requests for a service application from a client device to the platform hosting the service and for redirecting responses from the host platform to the requesting device. The multi-function devices 102 include a user interface (UI) 112 for the display thereon of icons and other information about registered services. The UI includes a touchscreen display for receiving user input via a touch-sensitive surface, and may further include any of a keyboard, keypad, mouse, and the like. In the embodiment shown, the multi-function devices are document reproduction systems which include a tray 114 for document input, and paper trays 116 for retaining a variety of print media. Such devices are capable of performing a print/copy job function as is generally known in the document reproduction arts. Each of the multi-function devices is made EIP-enable by the installation of a software interface that effectuates the display on the UI of icons of registered application services such that the service can be selected by a user interacting with the icon directly from the UI.

It should be appreciated that the majority of the devices that typically make up a P2P network are multi-function devices and "headless boxes". Headless boxes don't have a monitor, keyboard, or mouse associated therewith. Rather, ports are provided for connecting various forms of I/O devices used to configure the box when they initially arrive, e.g., the system administrator plugs the box into a docking station and preconfigures it before plugging it into the network. Once the headless boxes are connected to the network they can be interacted with via a network connection, e.g. telnet or SSH.

Figure 2:
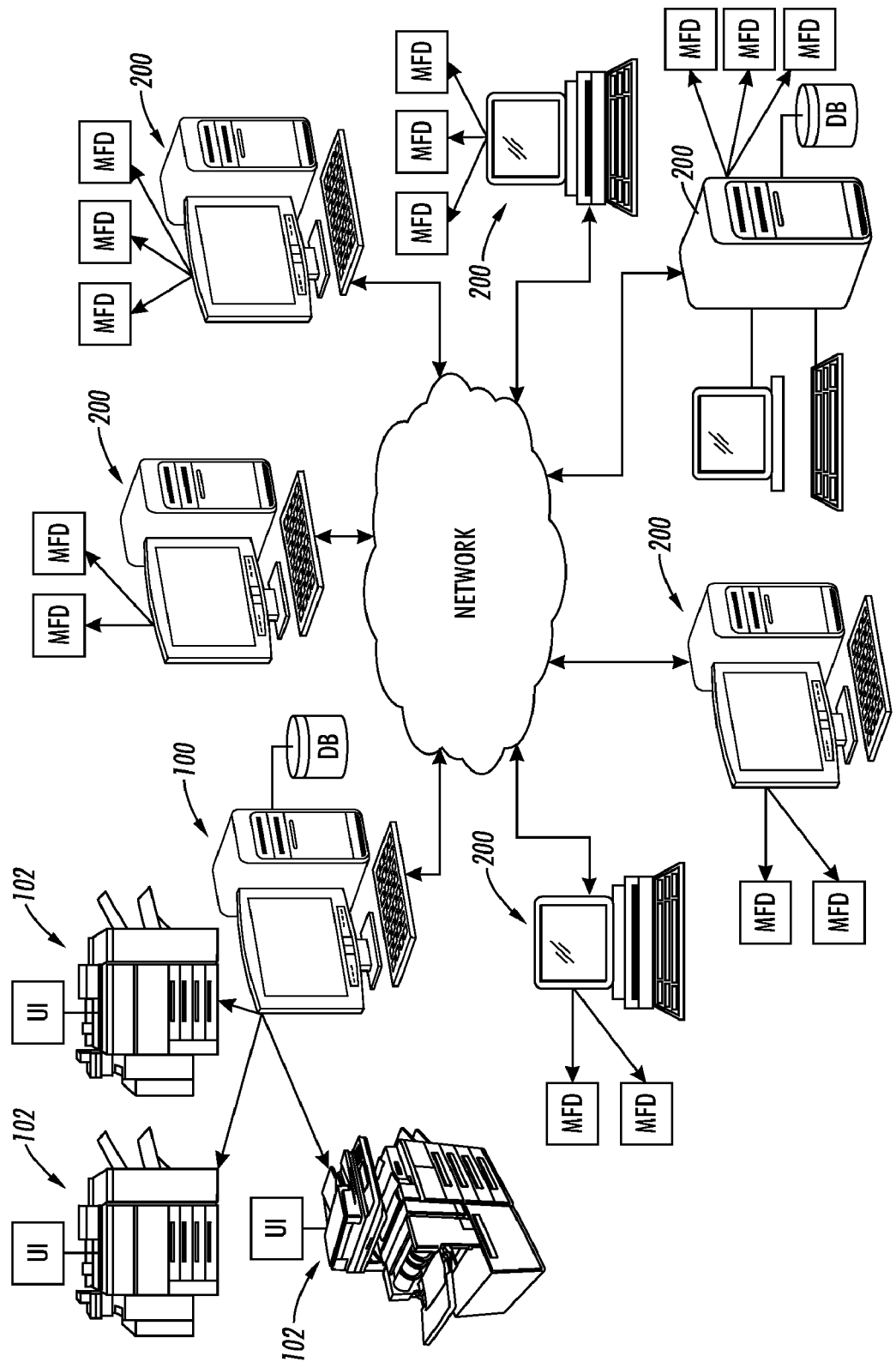
FIG. 2 illustrates one example enterprise network of computer platforms and multi-function devices wherein the present method will find its intended uses.

Reference is now made to FIG. 2 which illustrates one example enterprise network of computer platforms and multi-function devices wherein the present method will find its intended uses.

Networked computer platform (NCP) 100 and its multi-function devices (MFDs) 102 (of FIG. 1) is shown networked with a plurality of other NCPs 200 and their respective MFDs 202. Each of the NCPs acts as a node in the P2P network. The NCPs and the MFDs collectively form the enterprise network. In order to show all the multi-function devices within the confines of a single illustration, many of the devices have been reduced to a simple box labeled "MFD". Each box is intended to represent any of a wide variety of multi-function devices as defined herein. It should be appreciated that, in a an enterprise network configuration, any of the NCPs or MFDs may be physically located on separate floors, separate buildings, or on separate sites.

Figure 3:
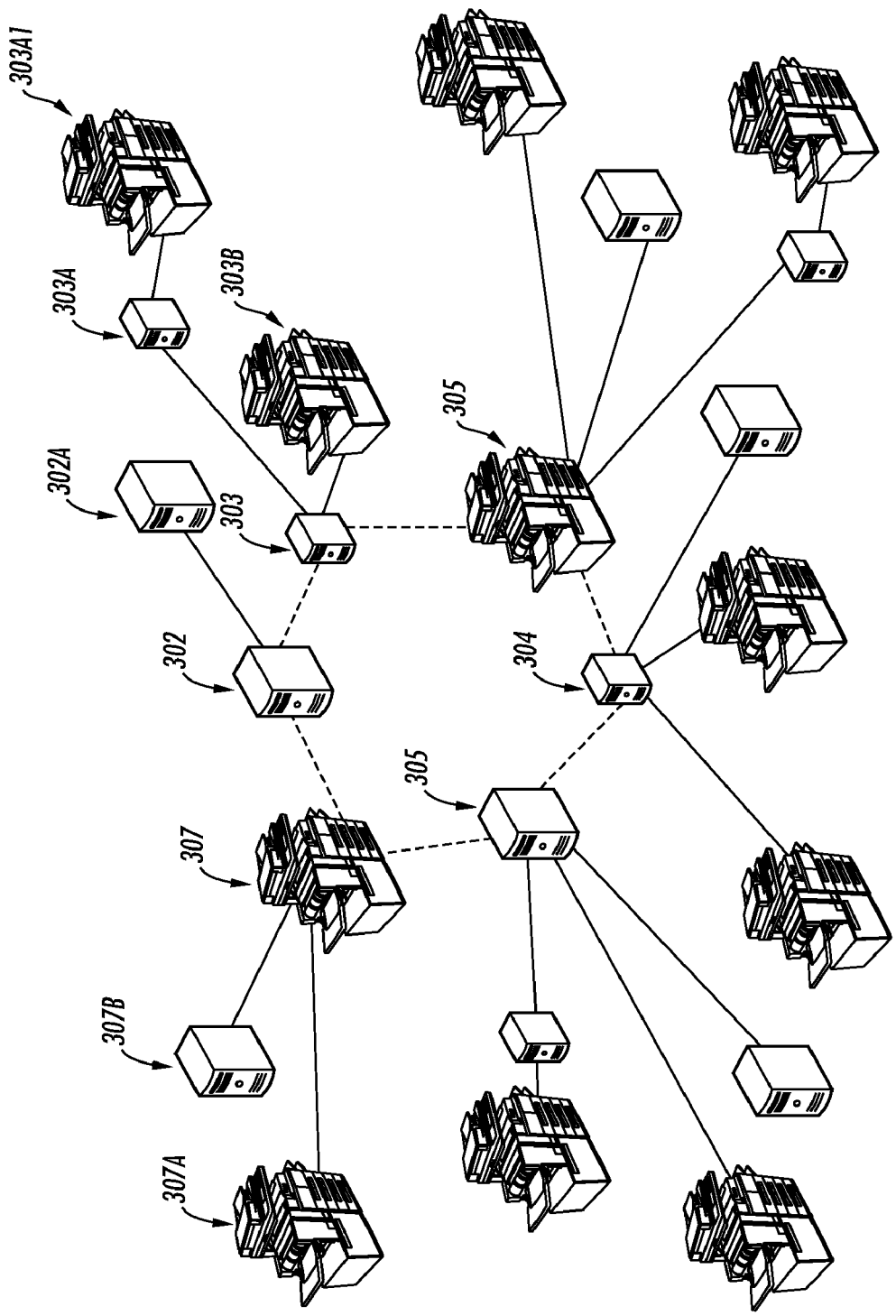
FIG. 3 illustrates another example enterprise network of computer platforms and multi-function devices wherein the present method will find its intended uses.

Reference is now made to FIG. 3 which illustrates another example enterprise network of networked computer platforms (NCPs) and multi-function devices (MFDs) wherein the present method finds its intended uses.

A plurality of NCPs 302-305 and MFDs 306-307 are shown assuming a variety of different subnet configurations. For instance, NCP 302 forms a subnet with NCP 302A. NCP 303 forms a subnet with NCP 303A and MFD 303B. NCP 303A forms a subnet with MFD 303A1. MFD 307 forms a subnet with MFD 302A and NCP 307B. FIG. 3 is intended to show that there may be more than one NCP in a subnet; that a single NCP may not service any MFDs (such an NCP merely hosts services); and that various subnets may be nested within other subnets. It should be clear that network communication may pass-through a MFD. Such an MFD would be configured with a network card, wireless interface, or a dedicated processor which effectuates such communication. Other network configurations of NCPs and MFDs are possible. The present method should not be considered as being limited to any specific network configuration. The above-described illustrations are intended to provide a framework for the following discussion.

Figure 4:
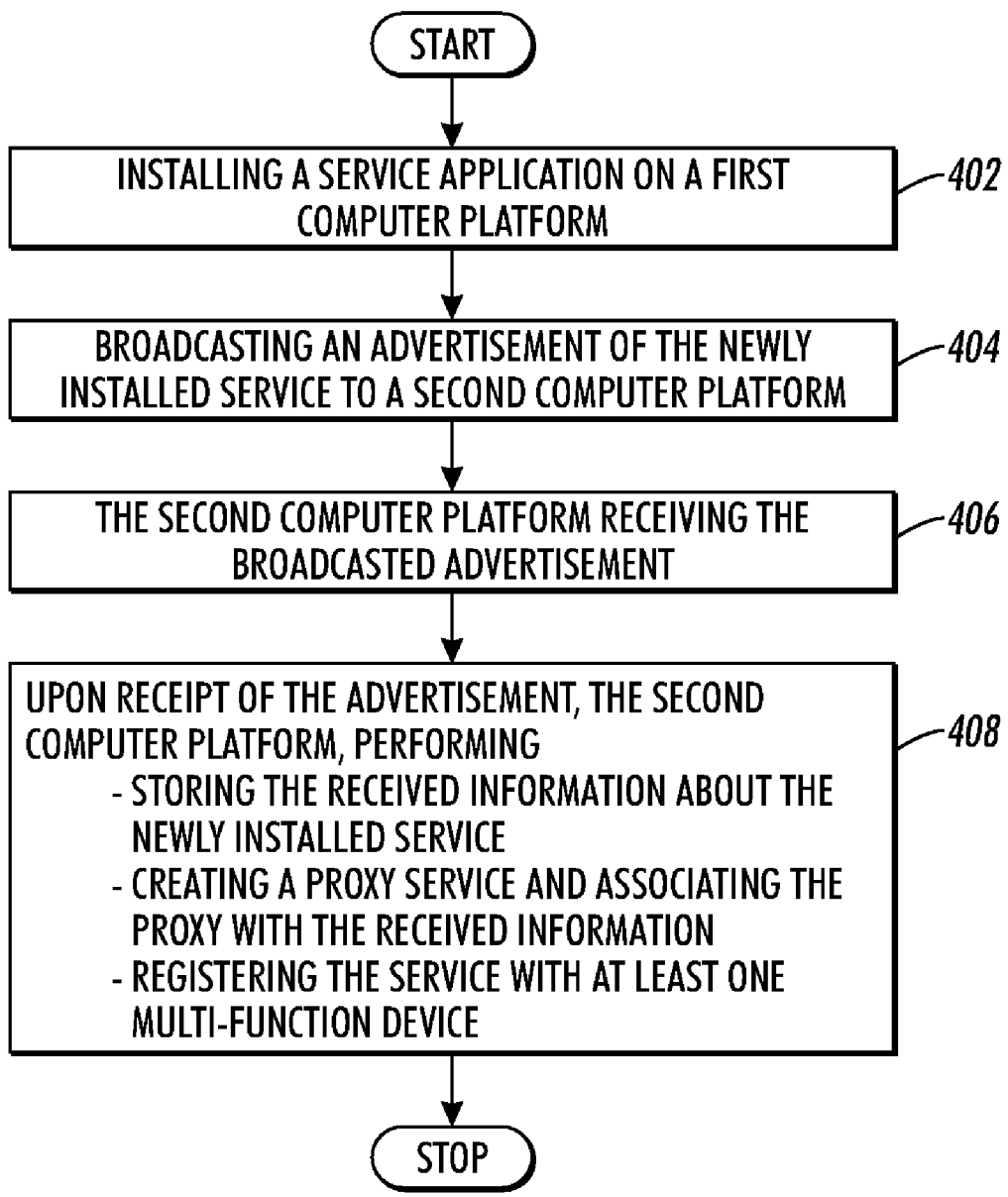
FIG. 4 illustrates a flow diagram of one example embodiment of the present method for sharing EIP service applications across a network of computer platforms and multi-function devices.

Reference is now made to FIG. 4 which illustrates a flow diagram of one example embodiment of the present method for sharing service applications across a network of computer platforms and multi-function devices.

In one example embodiment of the present method for replicating a service application across a network of computer platforms and multi-function devices, at 402, a service application is installed on a first computer platform. The first computing platform is in communication with a second computing platform over a network. The second computing platform is in communication with at least one multi-function device. At 404, an advertisement about the newly added service is broadcast over the network by the first computer platform to a second computer platform. In one embodiment, the advertisement about the newly installed EIP service application comprises a service name and a location of the EIP service application on the network. Other embodiments for the advertisement are discussed in detail herein. At 406, the second computer platform receives the broadcasted advertisement At 408, upon receipt of the broadcasted information, the second computer platform performing the following steps: the received information about the EIP service application is stored; a service proxy is created and associated with the stored information; and the EIP service is registered with the multi-function device. Registration of the service involves placing an iconic representation of the EIP service application on a user interface of the multi-function device and associating the icon with the service proxy such that a user selection of the icon causes the service proxy to initiate a call to the EIP service application.

In a manner as will be discussed herein further, the second computer platform can periodically make a determination whether the registered EIP service application is no longer available. If it is determined that a registered EIP service is no longer available, the second computer platform can de-register the EIP service application from any of the multi-function devices on its subnet whereon this service has been registered. De-registration involves in part, removing the icon from the user interface of the multi-function device whereon the EIP service is registered, deleting the stored information about the EIP service application, and terminating the service proxy.

Other embodiments and features and enhancements of the present method will now be discussed in further detail.

Assume that an enterprise network is configured according to the embodiment of the network of FIG. 2. Assume further that a custom service application was developed to address an organization-specific business challenge. That EIP service solution was tested and approved. Thereafter, the EIP service is installed on any of the computer platforms 200. The computer platform whereon the EIP service application is installed is referred to as the host platform. Although the EIP service application, in this scenario, has been installed on a single platform, it may be installed and hosted by multiple platforms in the network.

Upon installation of the EIP service, the network computer platform which hosts the newly installed EIP service broadcasts information about the EIP service across the network. The broadcast takes the form of an "advertisement". The advertisement propagates across the network as nodes echo the broadcast to other nodes in a manner well known in the arts. One example embodiment of an advertisement contains: a "Service ID" which identifies the EIP service by name; an "Endpoint" which identifies the EIP service by a unique location; and a list of "Service Properties". One example Service ID is the string "Distributed Fax". This string is used for explanatory purposes. The string is a unique service namespace for this particular EIP service and is the same for all identical EIP service applications installed on any computer platform on the network. Every EIP service has a unique namespace. Each namespace contains only one EIP service. Being that different vendors may supply different "Distributed Fax" services, relying solely on a string to uniquely identify a service may not be sufficient. The namespace may further comprise a URL which contains not only the general service type but also information about its vendor in the domain portion of the URL (e.g. "ws.xerox-vendor.com").

The Endpoint points to the location of the computer platform hosting the EIP service application on the network. One example Endpoint is: "http://192.168.0.1:8088/XeroxWs/FaxService". The Endpoint may contain additional information necessary to enables an interaction with the EIP service application. The Service Properties is a list which contains other information about the EIP service and information needed to effectuate a registration of this service with a multi-function device. An example "Service Properties" includes a "Small Icon" URL which points to an image file of the icon which will be displayed on the UI of the device whereon this EIP service is registered; a "Descriptor" URL which points to a file that contains text intended to be displayed on the UI along with the icon; and a "Large Icon" URL which points to a larger version of the small icon which finds its uses in devices configured to provide enhanced features for visually impaired persons. The list of Service Properties may further include URLs to files containing images, video, audio, and the like, which are further needed for enabling various features and capabilities for this EIP service. Vendor information may also be included, where appropriate. In one embodiment, the computer platform initiates the retrieval of one or more files referenced in the advertisement and stores them locally for quick access and retrieval. The various files indicated in the advertisement for the service may be accessed locally by the computing platform. One or more of these URLs may be provided to a registration service hosted by the multi-function device and retrieved at the time the EIP service is registered with the device.

Other embodiments of advertisements include a list of "Devices" whereon the advertised EIP service is intended to be registered. Alternatively, the list includes devices which the advertised service cannot be registered because the EIP service is not appropriate for that device for reasons, such as, the device does not provide one or more features or functionality required by the EIP service. Not all EIP services need to be registered with all devices. Custom EIP service applications are developed which are device-specific.

Still other embodiments of an advertisement for a service include information about load balancing and other performance and optimization techniques and algorithms which the service proxy may find helpful in determining which identical services listed in the lookup table is best to access. Load balancing techniques can be performed based on, for example, a round-robin, random selection, usage history, and the like. Performance and optimization algorithms can be based on factors such as network traffic, available bandwidth, system loads, etc.

Alternatively, the service advertisement contains only the Service ID and a location of the hosting platform. The broadcasting host then waits for queries to be received from computing platforms across the network who are interested in that service. In response to receiving such queries, the host platform then broadcasts the complete service advertisement directly to the requesting computer platforms. Computer platforms which are not interested in the broadcasted EIP service ignore the advertisement. Others may query the host about specific aspects of the EIP service and make a decision whether they want the EIP service based on further information received about the service.

When an advertisement is received by a computer platform, a timestamp is obtained. The timestamp can be sent by the host platform along with the advertisement for the service or a system clock can be queried by the receiving computer platform upon receipt of the advertisement. The timestamp is used to identify a time at which this particular service was known to be available from the platform hosting the service. It also provides an indication when the table entry of this service was last updated.

To determine whether information about a particular EIP service in a table entry is stale, the timestamp is frequently checked according to a pre-defined interval. One example interval for comparison is every minute or when the platform has been idle for a predefined number of cycles. Such a time interval might also depend on the risks associated with a user approaching the UI of the device and selecting a service which is no longer available. If such risks are deemed too high to be acceptable then the time interval can be shortened accordingly. Such an interval also might be set based on an amount of usage a particular service application receives. If it is determined that a table entry has become stale by a pre-determined amount of time having lapsed since the service last advertised, then the computer platform can query the platform hosting the EIP service about whether anything regarding the service has changed since the last timestamp. The host platform can simply respond that nothing has changed and the timestamp associated with this service in the table entry would be updated. If something about the EIP service has changed, the host platform can respond with the full advertisement about the service or provide only the fields which have changed. The host can also respond with an indication that the service is presently off-line or otherwise no longer available.

If a response is not received from the queried host platform in a predetermined amount of time, the computer platform which initiated the query can assume that the host platform has gone off-line or that a network failure has occurred. A pre-determined course of corrective action can be taken such as, for example, temporarily removing the icon from the device's UI and setting a time interval for requesting an update from the host platform; or deleting the service from the table entry of the lookup table and de-registering the service from each multi-function device if no other identical services exists in this table entry. Many courses of action can be taken.

Alternatively, computer platform hosting various service applications can be configured to periodically broadcast a list of currently available services. Such a list would be maintained and updated by the host platform as EIP service applications are installed or removed. Computer platforms would receive a list from each host platform and compare the services on each list to the various table entries in their respective lookup tables. If an EIP service appears on the list but is not found to the associated table entry for this Service ID, the computer platform would query the host platform for the full advertisement for this service and, upon receipt of that advertisement, add that service to the appropriate table entry and perform other tasks more fully described herein. The periodic broadcast by all host platforms in the network of lists of currently available EIP services could be made to occur at a time when network traffic is low.

Each computer platform serving one or more multi-function devices on its respective subnet acts as a registrar for those devices. As a registrar, each computing platform maintains its own lookup table with table entries. In one embodiment, each table entry contains a list of identical EIP services being hosted by different platforms in the network. Each EIP service in a table entry has a plurality of fields containing information about the service that was received as part of the advertisement for this service. Such fields would contain the location of the EIP service over the network, the timestamp when the EIP service was last known to be current, and other information obtained, for instance, from the Service Properties list.

A lookup table is a software construct well known in the programming arts. Embodiments of lookup tables vary and depend on many factors such as, for example, desired complexity, programming language used, available memory, to name a few. Lookup tables may take the form of a multi-dimensional arrays, linked lists, arrays of pointers to structures, and the like. In the example embodiment discussed herein, the lookup table takes the form of a multi-dimensional array having a row/column format with individual table entries indexed by unique Service ID. In this embodiment, a single table entry is used for all services having the same Service ID. Thus, identical services, i.e., the same EIP service applications hosted by different platforms, are stored in the same table entry. Fields associated with each identical service in each table entry contain information specific to that service such as the location, host, protocols, timestamp, etc. One service proxy is associated with each table entry upon creation, no matter how many identical services that table entry may contain. A timestamp field is also associated with each EIP service in a table entry. The timestamp is used in a manner previously described.

When a computer platform receives the EIP service advertisement (either a newly installed EIP service or a rebroadcast of an existing EIP service), the receiving computer platform first checks its lookup table to see if that EIP service already exists in a table entry indexed by Service ID. If the computer platform determines that an entry in the lookup table already exists for this EIP service then a check is performed to determine whether the service is from the same host. This is achieved by a comparison of the Endpoint where the service is hosted. If the advertised service from this same host is found in the table entry then the fields of this service's entry are checked against the information contained in the advertisement for accuracy. If information contained in the advertisement does not match the information stored in one or more of the fields in the table entry for this service then something has changes such as, for instance, the EIP service application has been relocated in a different location on the host platform, or the image file for the icon has changed or has been moved, or some other information about the EIP service is different or new. The computer platform then updates the table entry fields accordingly such that everything the computer platform knows about this service is accurate as of the current timestamp. If nothing has changed then the duplicate information is discarded. A timestamp field in the table entry is updated to indicate the last time the information about this EIP service was known to be current.

If the receiving computer platform determines that a table entry for this Service ID exists in the lookup table but the advertised EIP service is from a different host platform, then this EIP service must be another instance of an already available service. In this case, the computer platform would add this identical service to a list of available EIP services under the table entry for this Service ID. The fields in this table entry associated with this newly discovered service would be updated with the information contained in the advertisement. Two identical EIP services being hosted by different host platforms would now appear in a list of available service under the same table entry in the lookup table. Since this is not the first instance of this same service, the EIP service is already registered with the appropriate multi-function devices and there already exists a service proxy for this Service ID (table entry). Thus, the EIP service is not re-registered and a second proxy is not created. An icon for this service already appears on the UIs of the MFDs whereon this EIP service is registered. It should be understood that the same service is only registered once with any single multi-function device in order to prevent multiple instances of the same icon for the same service from appearing on the UI. Additional instances of identical EIP services are not registered with any device but instead these are added to a list of identical service in the table entry for this Service ID and the table entry fields for this service updated accordingly.

If the computer platform determines that no table entry for the advertised EIP service exists in the lookup table then the service must be an entirely new service which has just come online. Since no table entry for this Service ID exists, the computer platform initializes and creates the table entry for this type of service and updates the various entry fields for this entry with information contained in the advertisement. A timestamp is also stored in a field in this table entry to provide an indication when the EIP service was last known to be current. Once the table entry is created, the computer platform determines which, if any, of its MFDs to register this new EIP service with. Such a determination is user-definable and may depend on the type of EIP service or the capabilities of the MFDs. A list of appropriate MFDs may have been included with the advertisement for this service. If this service is not appropriate for an MFD then the EIP service is not registered with that device. For example, a service requiring a device capability to scan a document into digitized form would not be registered on a device which did not have a scanner. In one embodiment, before a computer platform registers any service with a multi-function device, a device performance check is performed. Such a determination may involve by cross-referencing known device capabilities with service features obtained from the Service Properties list. If the device is deemed to not be appropriate for this particular EIP service then the EIP service is not registered with that device. There may be EIP services which are not registered with any multi-function device a particular computer platform services. In the instance wherein an EIP service is not registered with any MFD, the computer platform can still proceed to add the new EIP service to the associated table entry and perform all the updating and book-keeping for this service. But since the EIP service is not registered with any of its MFDs, the service will never be invoked.

If the advertised service is indeed to be registered with one or more MFDs then the computer platform creates a service proxy and associates the newly created proxy with this table entry. This service proxy will service all identical EIP services listed in this particular table entry (same Service ID but are hosted by different platforms). In one embodiment, a single service proxy is associated with each unique EIP service. In an alternative embodiment, one service proxy services different types of EIP services. Once the service proxy has been created, the computer platform then proceeds to register this newly added EIP service with each appropriate MFD. The service proxy created for this service and associated with this table entry is responsible for directing and re-directing calls to/from the device to the computer platform hosting this EIP service. In another embodiment, one service proxy services all table entries of all available hosted EIP services.

Registration of an EIP service with an MFD makes the service selectable on that device. The EIP service is made selectable by the placement of an iconic representation of the service on the device's UI. That service icon points to its associated service proxy. Each service icon appearing on the device UI is linked to their respective service proxies. The service icon is linked to its service proxy by being made to point to it in a manner known in the arts such that a user interaction with the icon makes a call to the proxy. Specifically, upon a user selection of the icon, the MFD's browser issues a GET to the URL that points the service proxy on the computer platform. Any information which the registration service needs to display the icon image and any other text, etc., which is also to be displayed on the device UI, is either obtained directly from service's table entry in the lookup table or retrieved from the host platform. Completion of the registration process means that an icon for this EIP service appears on the UI and the EIP service is available to the user.

A .Net client helps facilitate registration by invoking a registration service hosted by the MFD. The Microsoft .NET Framework is a software technology that is available with several Windows® operating systems. It includes a relatively large library of pre-coded solutions to common programming problems. A virtual machine helps manage the execution of programs written specifically for the .Net Framework. The .Net client simply makes a web service call to the EIP-enabled device to actually perform the registration. Web service calls are by nature platform and language independent and can be implemented in many languages, including C/C++ (which are very commonly used to embed small-footprint software in devices such as MFDs). Thus, registration/deregistration is not intended to be restricted or otherwise limited to a .Net implementation because it can be performed by any language capable of opening a TCP/IP connection and sending/receiving SOAP/HTTP. The list of such languages is unbounded as new languages or variants of existing languages are continuously introduced that can easily meet these requirements.

Upon a user selection of the icon, the service proxy is called and it references the table entry in the lookup table which it is associated with. Information required by the service proxy to initiate a communication with the platform hosting the requested EIP service application is retrieved from fields in the table entry associated with the specific requested EIP service. As previously discussed, in instances of multiple services appearing in a list in the same table entry, the service proxy makes a selection from the list of available identical EIP services as to which EIP service to access. The service proxy then initiates a communication with the host platform requesting access to the installed hosted EIP service application. More specifically, the service proxy forwards the MFD's browser's HTTP GET call to the URL specified by the Endpoint provided in the advertisement. The server on the host platform hosting the EIP service application proceeds to serve the EIP application service over the network. The service proxy directs communication to the host platform and re-directs communications received from the host back to the MFD. In the event that the call to the Endpoint fails, e.g. the platform hosting the EIP service has crashed, the service proxy can select another instance of the identical EIP service from the list, if any, and the GET re-forwarded. The GET may be re-executed a number of times before a failing. Too many attempts to complete the GET may give the user the appearance of a delay or that the EIP service isn't working or that something has crashed. Where possible, errors encountered are preferably corrected in a manner which is made transparent to the user standing at the device UI. If the EIP service is prematurely halted or the communication interrupted, recovery protocols managing the proxy/server interface take affect. Since server/proxy communication interfaces are well known, a further description of such protocols is omitted. When the EIP service application has completed its intended function, the EIP service terminates, communication between the host platform and the device is ended, and the service proxy becomes idle once again.

When an EIP service is no longer available, for reasons previously discussed, the computer platform deletes that service entry from the lookup table. If this is the only instance of this EIP service in the table entry, i.e., there is only this one entry in the list of EIP services for this table entry, then no alternative EIP service is known to exist and the EIP service is de-registered from each MFD whereon the EIP service is registered. De-registration means that the service icon is removed from the UI such that the EIP service is no longer selectable by the user. The associated proxy service is also terminated.

In an alternative embodiment, each computer platform maintains a list of EIP services which can be self-installed through an installer program in the event that a service is no longer available and no other instance of that EIP service is known to exist anywhere else on the network. The computer platform would then self-install that EIP service (becoming the host platform for that EIP service) and then would broadcast an advertisement for the newly installed EIP service in a manner previously discussed. Alternatively, the computing platform can query a specific "admin" platform on the network and ask if an instance of this EIP service is available for installation. The admin platform would then install the requested EIP service and then send out an advertisement for the service. Or, it would request another computing platform on the network to install the EIP service and broadcast the advertisement.

Figure 5A:
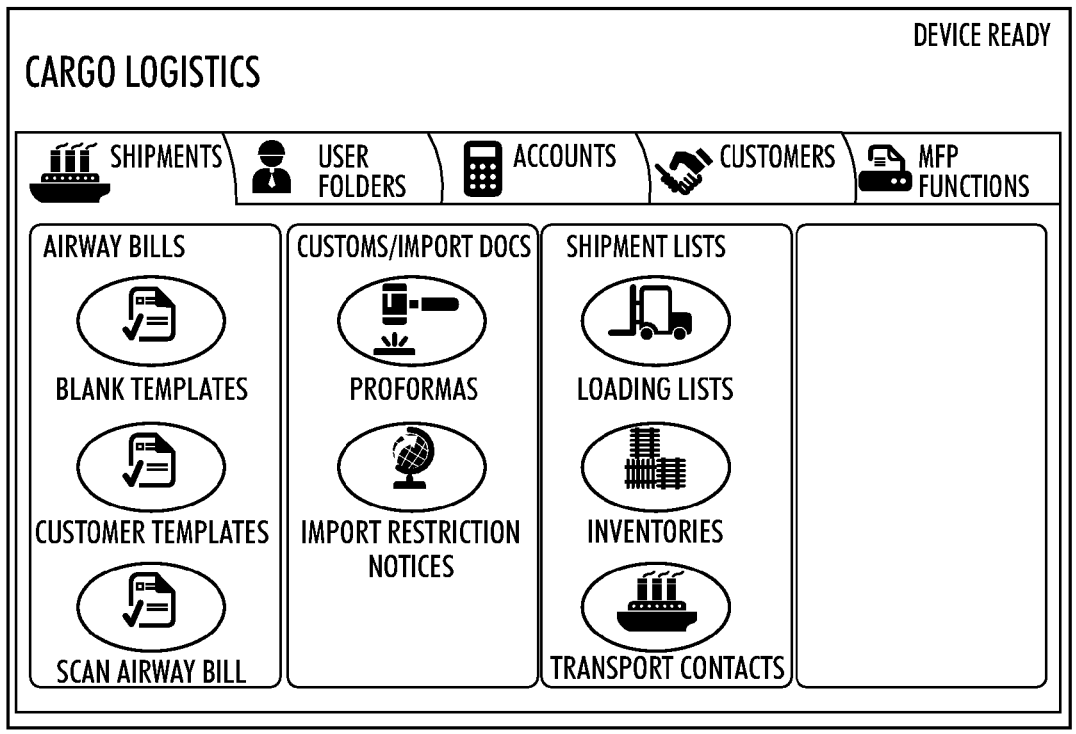
FIGS. 5A and 5B illustrate one example embodiment of a multi-function device's UI having displayed thereon a plurality of iconic representations of different registered EIP service applications.
Figure 5B:
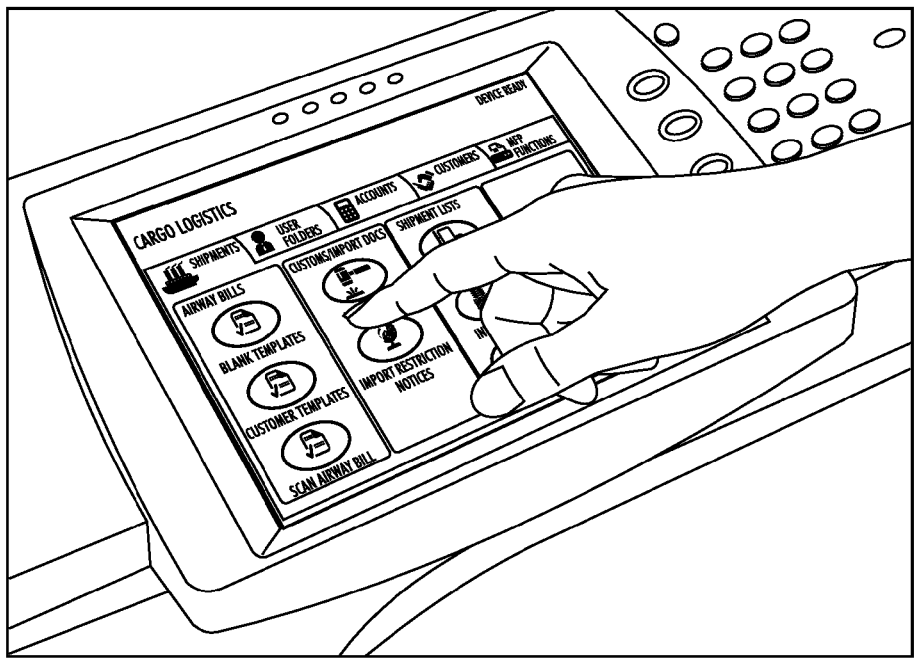

Reference is now made to FIGS. 5A and 5B which illustrate one example embodiment of a touchscreen on a device UI having displayed thereon a plurality of iconic representations of different registered EIP application services.

In FIG. 5A, the display appearing on the UI of the MFD was designed for a fictitious company called "Cargo Logistics". In the embodiment of the UI display shown, there are a plurality of icons and selectable tabs. Under each of the tabs may be one or more icons each for another EIP service. The device's programmable touchscreen display can assume a variety of formats having, for instance, menus, tabs, options, buttons, icons, data entry portions, and the like. The browser on the device manages many of the displayed features. Each icon may be configured to provide a visual representation of the EIP service. Alphanumeric text may also be associated with an icon. For example, the EIP service labeled "Transport Provider Contracts" is shown with an icon representing a cargo ship. Such an EIP service might, for example, cause the loading of specific forms from a particular paper try, or may provide a copy of any scanned contracts directly to the inbox of a contracts specialist in the legal department. The "Loading Lists" icon is shown with a forklift machine and may perform an inventory service which interacts with a database in a company warehouse. Other icons on the touchscreen UI would be associated with custom EIP service applications developed to perform other functions. The specific EIP services being performed by any of the displayed icons will depend on the business solutions vendors have developed for Cargo Logistics. It will be appreciated that selection of any of the service icons may alternatively bring up other pages whereon other icons appear. FIG. 5B shows the touchscreen of FIG. 5A displayed on an MFD called the WorkCentre-7345. A user selects the desired EIP service by physically touching the appropriate icon on the MFD's touch-sensitive display.

By way of example, assume that a MFD on a $10^{th}$ floor in the enterprise network of MFDs contains a fax board connected to a live phone line. A MFD on a $1^{st}$ floor has document scan capability but does not have an active phone line connection or perhaps does not have a fax capability. The user on the $1^{st}$ floor desires to fax a document without having to take the elevator to the $10^{th}$ floor to perform this job function. The EIP service application which effectuates a distributed fax solution has already been installed on a host platform in the network. That EIP service was advertised and is presently registered with the MFD on the $1^{st}$ floor. Thus, a "Distributed Fax" service icon appears on the UI of the $1^{st}$ floor MFD. A user approaches the MFD on the $1^{st}$ floor and selects the "Distributed Fax" icon in a manner shown with respect to FIG. 5B. A communication with the platform hosting the selected EIP service is initiated by the service proxy. Depending on the complexity of the service application and the nature of the business solution the EIP service application addressed, the user may be prompted for inputs. The EIP service application may walk the user through a plurality of different options. In this example, the user is prompted to enter a fax number and other information about the documents to be faxed. Eventually, the user is prompted to place the document to be faxed on the device's platen and hit "SCAN" to start the scanning. The user is prompted to hit a "SEND" button displayed on the UI after all the pages have been scanned. Selection of the SEND button cause the service application to retrieve the scanned digitized information from the MFD and route that data to the device on the $10^{th}$ floor with the live phone connection. The $10^{th}$ floor MFD is then instructed to call fax number previously entered by the user on the UI of the $1^{st}$ MFD. Upon the establishment of a telephonic connection with the intended fax recipient, the digitized document is sent. The Distributed Fax EIP service application may have additional sophistication such that it receives from the MFD a confirmation that the fax transmission completed successfully. The EIP service may further provide the user with an email notification that the fax was received and provide a copy of the confirmation. The EIP service may proceed to bill a user account for the fax service. The functionality of this EIP service would depend on the complexity of the business challenges being addressed.

It should be understood that such EIP service applications may enable a user at one device's UI to control the functionality of devices located elsewhere on a network. Such capabilities would depend on the EIP service intended to be performed and the nature and complexity of the functionality of the networked devices. Such EIP service applications can be installed on a single computer platform on the network and automatically registered and de-registered with one or more multi-function devices through an implementation of the present method and thus rapidly replicated throughout the enterprise network without human intervention.

Advantageously, small footprint computer platforms capable of hosting EIP service applications over a P2P network can be purchased at relatively low cost and configured to perform the present method. One or more platforms can be configured to only host EIP service applications and not act as a registrar for any multi-function devices. Such a platform would preferably be placed in an area readily accessible to IT Managers, System Administrators, and the like, for quick installation of new EIP service solutions as these are developed, tested, and deployed.

Figure 6:
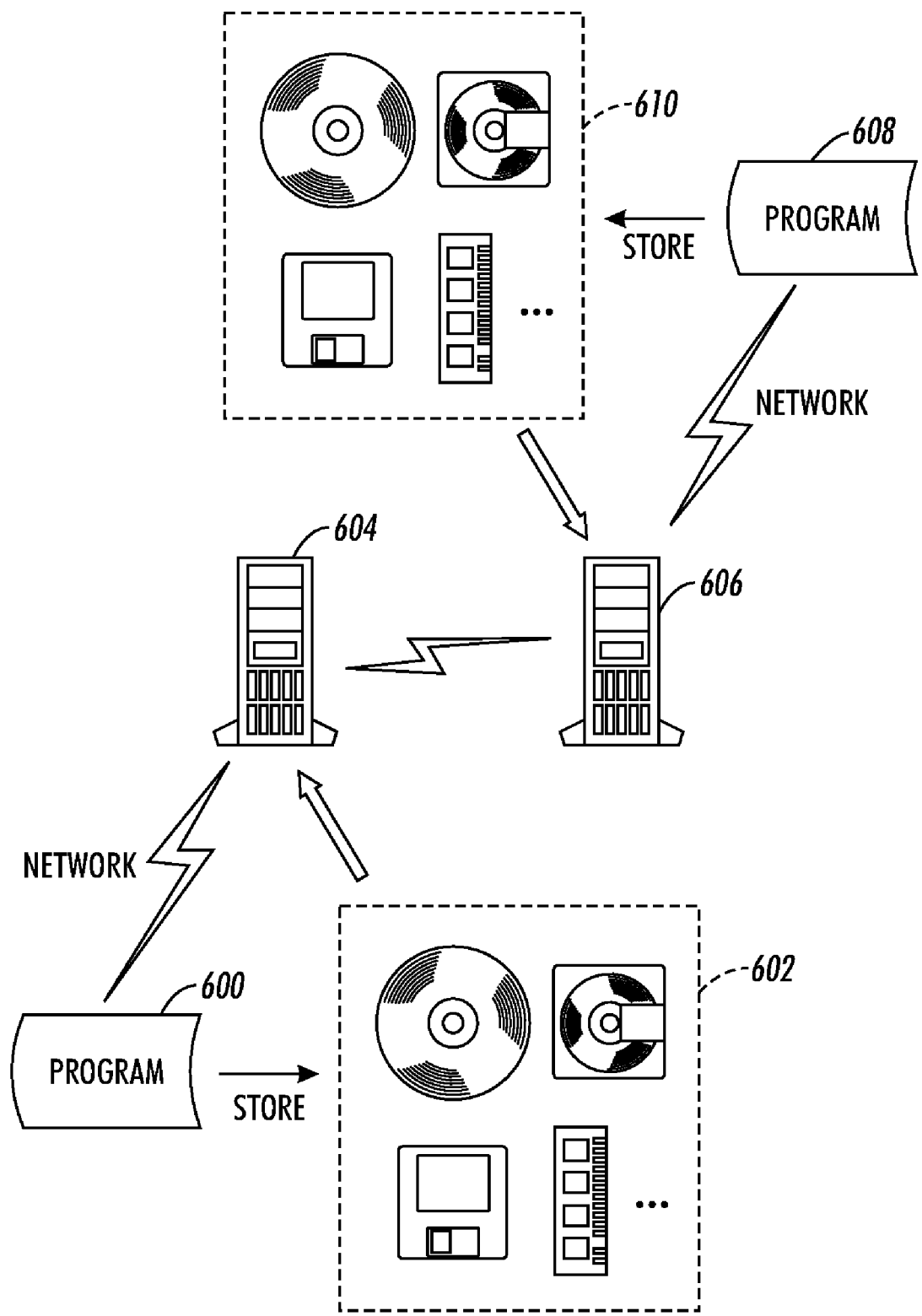
FIG. 6 is an explanatory diagram illustrating one example of a computer readable storage medium capable of storing machine readable instructions which, when mounted on a computer or a special purpose computer system, causes the system to perform one or more aspects of the present method as described above.

Reference is now made to FIG. 6 which is an explanatory diagram illustrating one example of a computer readable storage medium capable of storing machine readable instructions which, when mounted on a computer or a special purpose computer system, causes the system to perform one or more aspects of the present method as described above. The machine readable instructions may be modified by one computer and transferred to another computer. In the illustrated embodiment, one or more computer programs 600 for carrying out the present method are loaded on a computer-readable storage media 602 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states or orientations in response to program instructions having been transferred to the media. The computer programs containing machine executable instructions of the present method can then be mounted on computer 604 and transferred or otherwise communicated to computer 606. The program instructions can then be off-loaded to another medium 608, in original form or modified, including data, and stored on storage media 610. Both of the computer systems include processors capable of executing machine readable program instructions.

One or more aspects of the present method can be implemented on a special purpose computer capable of executing machine readable program instructions for carrying out one or more aspects of the present method. Such a special purpose computer would include a processor and a main memory capable of storing machine readable instructions and may include random access memory to support reprogramming and flexible data storage. The main memory may further incorporate one or more buffers to store or transfer data. The computer system may also include a secondary memory such as a hard drive and/or a removable storage unit such as a floppy disk, magnetic tape, optical disk, etc., to store software, data, and other machine readable instructions. The secondary memory may also include additional mechanisms which help effectuate the loading/unloading of computer programs or other machine instructions for execution. Example mechanisms include a program cartridge interface such as those found in video game devices, a removable memory such as an EPROM, or PROM, and associated socket, flash memory, and other units and interfaces which allow the transfer of files and data to the system. The computer may additionally include a communications interface that allows files and data to be transferred to external devices. Example communications interfaces include a modem, a network interface such as an Ethernet card, a communications port, a PCMCIA slot and card, etc. Data transferred via the communications interface are in the form of signals and may have the form of, for example, electronic, electromagnetic, optical, or other signals capable of being transmitted and received via a communications path configured to carry such signals. Such a path may be include wire, cable, fiber optic, phone line, cellular link, RF, or other channels.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein. Computer readable medium may additionally comprise information in a transitory state medium such as a network link or a network interface which may include a wired network or a wireless network which allows a computer to read such computer readable information.

It should be understood that the flow diagram hereof are intended to be illustrative. Other operations, for example, may be added, modified, enhanced, condensed, integrated, or consolidated. Variations thereof are intended to fall within the scope of the appended claims.

It should also be understood that one or more aspects of the present method may be incorporated in an article of manufacture, including one or more computer program products as defined herein. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in, and the like, as are known in the arts. Such an article of manufacture may further be shipped, sold, leased, or otherwise provided either alone or as part of an add-on, update, upgrade, or product suite by the assignee or a licensee hereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for replicating a custom EIP service application across a network of computer platforms each forming a subnet of multi-function document reproduction devices, said method comprising:
    installing a custom EIP service application on a host computer platform in communication with a plurality of computer platforms over a peer-aware network, each computer platform being a registrar for automatic runtime registration and de-registration of EIP service applications with multi-function devices being served on their respective subnets, said multi-function devices having a user interface for displaying selectable icons;
    broadcasting, by said host computer platform, information about said installed EIP service application over said network; and
    in response to said information having been broadcasted each computer platform forming a respective subnet performing:
        creating a service proxy for said EIP service application, said service proxy facilitating a communication between said EIP service application and each multi-function device in said subnet;
        creating an entry for said EIP service application in a respective lookup table, said lookup table mapping said installed EIP service application to a unique location on said host computer platform;
        associating said service proxy with said table entry; and
        registering said EIP service application with each multi-function device in said subnet, said registration comprising:
            placing an iconic representation of said EIP service application on a user interface of each multi-function device, said icon being selectable on said user interface; and
            associating said icon with said service proxy, said association enabling said service proxy to initiate a call to said EIP service application upon a user selection of said icon.

2. The method of claim 1, further comprising each computer platform forming a respective subnet determining whether said EIP service application is still available on said host computer and in response to said EIP service application being no longer available, each computer platform de-registering said EIP service application from multi-function devices on their respective subnet wherein said EIP service application is registered.

3. The method of claim 2, wherein de-registering said EIP service application comprises:
    removing said icon from said user interface of each multi-function device on said respective subnet;
    deleting said entry for said EIP service application from said respective lookup table; and
    terminating said service proxy.

4. The method of claim 1, further comprising each of said computer platforms periodically requesting an update from said host computer platform about said installed EIP service application.

5. The method of claim 1, further comprising:
    associating a timestamp with information about said installed EIP service application; and
    periodically comparing said timestamp with a current time to determine whether information is stale.

6. The method of claim 1, wherein upon receipt of said broadcasted information, each computer platform forming a respective subnet further performing:
    determining whether said EIP service application has already been registered with the multi-function device; and
    in response to a determination that said EIP service has not been registered with a multi-function device, registering said newly installed EIP service with said multi-function device.

7. A system for replicating a custom EIP service application across a network of computer platforms each forming a subnet of multi-function document reproduction devices, said system comprising:
    a plurality of multi-function devices each having a user interface for displaying selectable icons;
    a plurality of computer platforms in communication over a Deer-aware network, each of said computer platforms being a registrar for automatic runtime registration and de-registration of EIP service applications with multi-function devices being served on their respective subnets, one of said computer platforms serving as a host computer platform whereon a custom EIP service application is installed, said host computer platform broadcasting information about said installed custom EIP service application over said network; and
    in response to said information having been broadcasted each of said computer platforms having a respective subnet performing:
        creating a service proxy for said EIP service application, said service proxy facilitating a communication between said EIP service application and each multi-function device in said subnet;
        creating an entry for said EIP service application in a respective lookup table, said lookup table mapping said installed EIP service application to a unique location on said host computer platform;
        associating said service proxy with said table entry; and
        registering said EIP service application with each multi-function device in said subnet, said registration comprising:
            placing an iconic representation of said EIP service application on a user interface of each multi-function device, said icon being selectable on said user interface; and
            associating said icon with said service proxy, said association enabling said service proxy to initiate a call to said EIP service application upon a user selection of said icon.

8. The system of claim 7, further comprising each computer platform forming a respective subnet determining whether said EIP service application is still available on said host computer and in response to said EIP service application being no longer available, each computer platform de-registering said EIP service application from multi-function devices on their respective subnet wherein said EIP service application is registered.

9. The system of claim 8, wherein de-registering said EIP service application comprises:
removing said icon from said user interface of each multi-function device on said respective subnet;
deleting said entry for said EIP service application from said respective lookup table; and
terminating said service proxy.

10. The system of claim 7, further comprising each of said computer platforms periodically requesting an update from said host computer platform about said installed EIP service application.

11. The system of claim 7, further comprising:
associating a timestamp with information about said installed EIP service application; and
periodically comparing said timestamp with a current time to determine whether information is stale.

12. The system of claim 7, wherein upon receipt of said broadcasted information, each computer platform forming a respective subnet further performing:
determining whether said EIP service application has already been registered with the multi-function device; and
in response to a determination that said EIP service has not been registered with a multi-function device, registering said newly installed EIP service with said multi-function device.

* * * * *